Sept. 13, 1938.  L. KNÖCHL  2,130,139
FRICTION CLUTCH
Filed Aug. 17, 1936  3 Sheets-Sheet 1

Inventor:
Leo Knöchl
by S. Sokal
Attorney

Sept. 13, 1938.  L. KNÖCHL  2,130,139
FRICTION CLUTCH
Filed Aug. 17, 1936  3 Sheets-Sheet 2

Inventor:
Leo Knöchl
by S. Sokal
Attorney.

Sept. 13, 1938.  L. KNÖCHL  2,130,139
FRICTION CLUTCH
Filed Aug. 17, 1936   3 Sheets-Sheet 3

Inventor:
Leo Knöchl
by S. Sokal
Attorney.

Patented Sept. 13, 1938

2,130,139

UNITED STATES PATENT OFFICE 2,130,139

FRICTION CLUTCH

Leo Knöchl, Goppingen, Germany, assignor to L. Schuler, A. G., Goppingen, Germany Application August 17, 1936, Serial No. 96,429
In Germany July 30, 1934

12 Claims. (Cl. 192—36)

This invention relates to improvements in friction clutches.

For clutching a crank, eccentric press, shearing machine or the like to a driving shaft, the clutch can either be arranged on the slowly rotating crank shaft, or on a quickly rotating intermediate shaft. In the former case claw, striking gear, or rotary wedge clutches are employed, which owing to the necessary large masses to be accelerated and the consequent sharp blow produced on engagement of the clutch which stresses the clutch often to a greater extent than the turning moment set up during the actual working of the machine, allow of a relatively slow speed of operation of the press.

In the second case, friction clutches are employed which engage considerably more gently, but necessitate the employment also of two or more pinion transmission gears, the masses of which inclusive of the driven clutch member must be accelerated and braked. For accelerating all of these masses more energy is frequently required on clutching than during the actual working stroke of the machine, and again only a slow speed of operation of the press, which is frequently even slower than that allowed by the aforesaid blow-like engaging clutches arranged on the crank shaft is possible.

This invention makes use of the advantages offered by the gentle engagement of the friction clutches. In the clutch according to the invention, the transmission linkage of the clutch member is connected to a brake disc. If the latter is braked, the clutch member is put in operation.

The invention consists firstly in the use of this known clutch for crank driven presses and similar machines such that the driven member of the clutch is arranged on the crank shaft itself. The masses, to be accelerated, small in proportion to an intermediate shaft, (clutch disc, crank shaft, head of pressure rod) allow owing to the gentle engagement of the clutch an essential increase of the working speed.

In the constructional form and the method of working a rotary press, shearer, or the like, this clutch according to a further feature of the invention, is advantageously arranged so that the transmission linkage of the clutch member which is not itself locked is held in the engaged position by means of a suitable lock, for example a latch device, against its own tension and that of the clutch member.

The accompanying drawings illustrate one embodiment of the invention by way of example in which.

Figure 1:
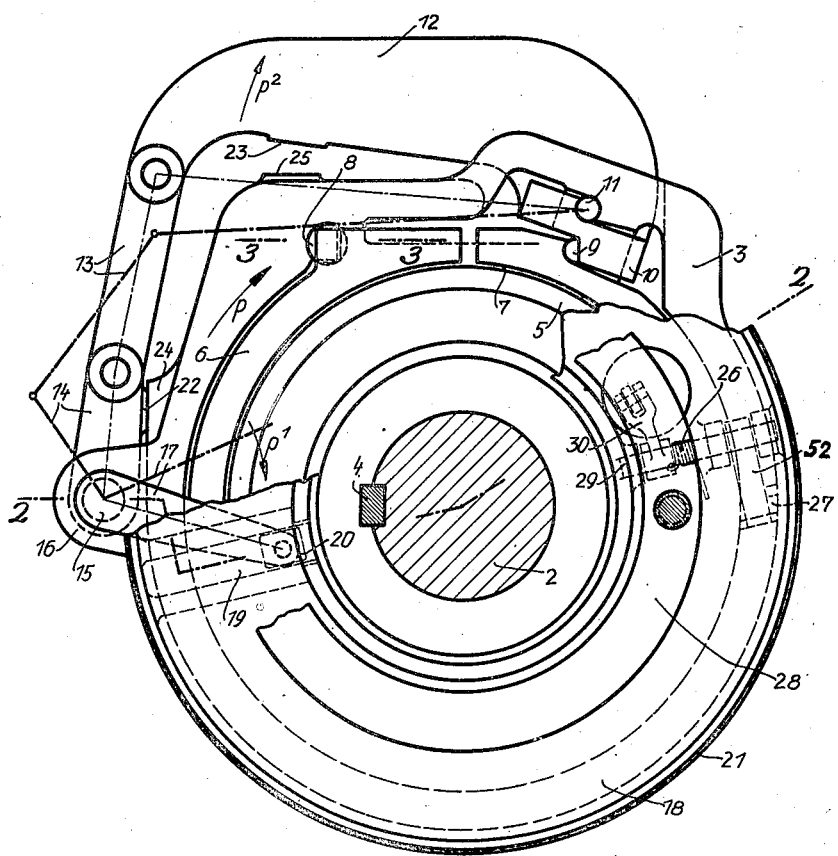
Fig. 1 is a front view of the clutch in its engaged position.
Figure 2:
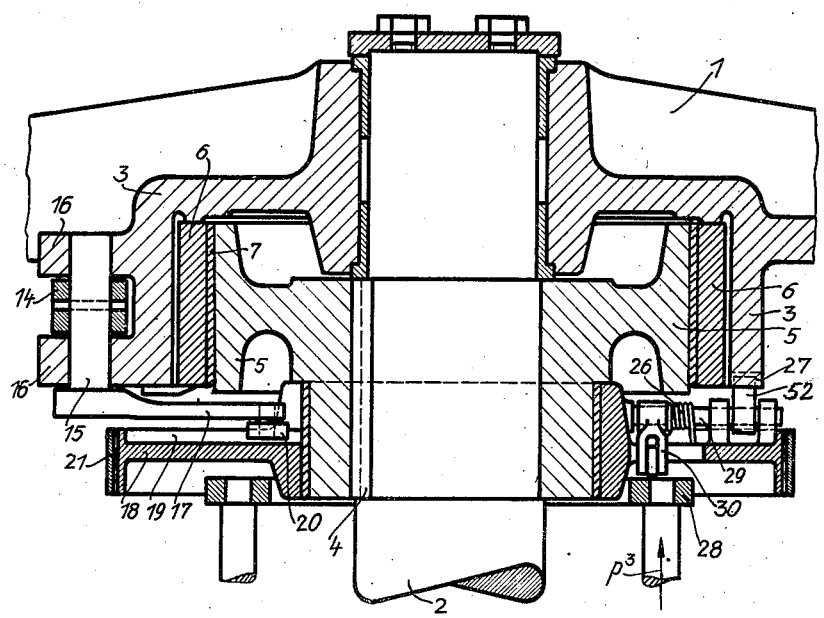
Fig. 2 is a section on line 2—2 of Fig. 1.

According to Figs. 1 and 2, the driving member of the clutch consists of a driving pulley 1 which is freely rotatably carried on the driven shaft 2 and is connected with a drum 3. This driving pulley which for the sake of clearness is not shown in Fig. 1 and only partly shown in Fig. 2 may be, for example, the pulley of a drive to be coupled to the shaft 2. The drum 3 surrounds a disc 5 secured to the shaft, for example by means of a key 4 against the rim of which a split clutch ring 6 having a friction lining 7 can engage. The clutch ring 6 is supported at one end by means of a bolt 8 against the drum 3 whilst the other end co-operates at 9 with the clamping member 10 of a lever 12 pivotally carried at 11. The lever 12 is connected through the plate or strip 13 and the lever 14 with the tensioning lever 17 rotatably carried by means of the bolt 15 on an extension 16 of the drum 3.

18 is a brake disc advantageously freely rotatable on the hub of the clutch disc 5 and carrying a radial groove 19. In this radial groove engages a slide block 20 rotatably carried on the end of the lever 17 so that by relative rotation of the disc 18 with respect to the constantly rotating drum 3 for example by braking by means of the brake band 21, the lever 17 is swung. This braking can either be effected by means of a hand or foot lever or through the medium of a control motor. For limiting the end positions of the transmission linkage of the clutch, stops 22 and 23 are employed which are arranged on the lever 14 or lever 12 and co-operate with projections 24 and 25 of the drum 3.

The mode of operation of the clutch is as follows:

Assuming that the clutch is disengaged, the lever 17 as well as the lever 14 with the strip 13 and the lever 12 are in the position shown by the broken lines, Fig. 1. To engage the clutch the brake disc 18 constantly rotating with the drum 3 and the linkage is forced, for example, by braking by means of the band 21 with respect to the drum 3, rotating in the direction of the arrow $p$, so as to produce a relative movement in the opposite direction, whereby the lever 17 is swung into the illustrated position, (arrow $p^1$). Consequently, the lever 12 is also turned under the action of the link connection 14 and 13 in the direction of the arrow $p^2$. The clamping member 10 of the lever 12 now draws the clutch ring 6 together, which ring lies in the declutched condition owing to its internal tensioning (similarly as with piston rings) on the inner surface of the drum 3. In this way, frictional drive is produced between the drum 3 rotating with the driving pulley 1 and the disc 5 keyed to the driven shaft 2. The lever 17 can only be swung so far until the stop 22 of the lever 14 engages the projection 24 of the drum 3 so that the clutch ring 6 is protected against over-turning. As now, as will be seen from Fig. 1, the lever 14 and the strip 13 are not in the fully extended position the brake disc 18 must for the purpose of maintaining the clutch in engagement, be held constantly braked. In order to avoid this, a latch 52 pivotally carried on the brake disc 18 is provided, which latch, when the clutch is engaged (after contacting with the stop 22 on the projection 24), is snapped under the influence of the spring 26 into a notch 27 on the drum 3 and so maintains the relative position between the brake disc 18 and the drum 3.

On declutching, the latch 52 must be first released. This is effected by means of an axially displaceable pressure ring 28 which on its displacement in the direction of the arrow $p^3$ acts against the roller lever 30 arranged on the bearing bolt 29 of the latch 52 and swings the latch 52 out of the notch 27. Now, as soon as this connection is released, the clutch linkage under the influence of the tension produced therein by the swinging of the lever 17 into the engaged position, as well as that of the clutch ring 6 returns with the simultaneous rotation of the brake disc 18 in the direction of the arrow $p$ (relative to the drum 3) into its disengaged position. Thus, the end position of the linkage is determined by the stop 23 of the lever 12 which bears against the projection 25 of the drum 3.

Figure 3:
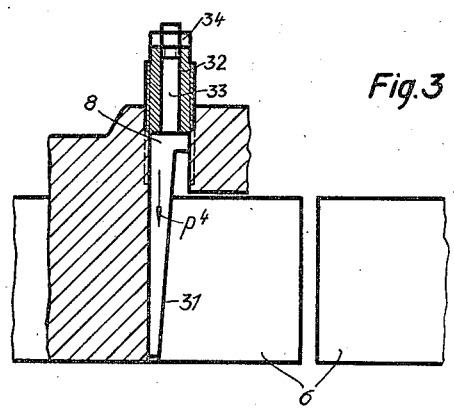
Fig. 3 is a view of a detail in section on line 3—3 of Fig. 1.

For the purpose of compensating for the wear of the clutch ring 6 or the friction lining 7 thereof, the device shown in Fig. 3 may be employed, this, however, not forming any part of the invention. The bolt 8 against which the free end of the clutch ring 6 is supported, is formed with an inclined surface 31 which cooperates with a corresponding inclined surface on the end of the friction ring so that on displacement of the bolt 8 in the direction of the arrow $p^4$ the clutch ring is somewhat tightened. The displacement of the bolt 8 is effected by means of a threaded sleeve 32 which is carried on the extension 33 of the bolt and is screwed into the internally threaded wall of the drum 3. The nut 34 screwed on the extension 33 against the sleeve secures the bolt in any adjusted position. As the amount of the closing movement for the clutch ring 6 is limited by the projection 22 of the lever 14 or after the latch 52 has been snapped into engagement by the latter, the moment transmissible by the clutch can be adjusted by a more or less strong tensioning of the clutch ring 6 by means of the bolt 8. If this moment is exceeded the clutch begins to slip.

Figure 4:
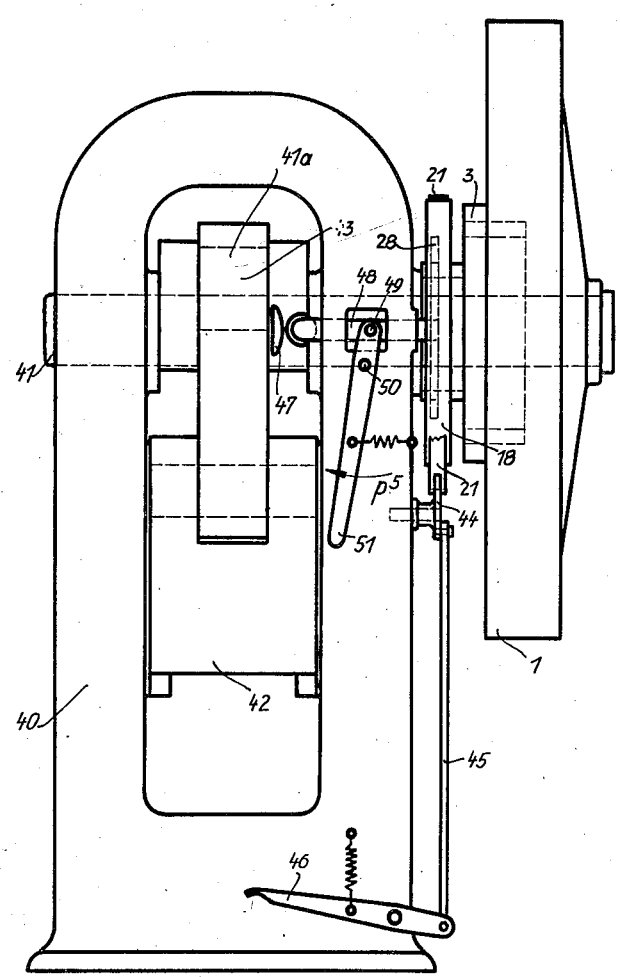
Fig. 4 shows a crank driven press embodying a clutch in accordance with the invention.

In Fig. 4 is shown the arrangement of a crank driven press which is provided with a clutch according to the invention. In this figure, 40 indicates the frame of the press, in which is rotatably carried, on the upper part, the crank shaft 41, and 42 indicates the ram of the press which is reciprocated in the frame 40 by means of the rod 43. The driving pulley is again indicated by 1, which pulley is arranged freely rotatable on the crank shaft and carries one of the clutch members 3. The tensioning of the brake band 21 of the brake disc 18 for the purpose of engaging the clutch is effected by means of the lever 44 and the rod 45 for example by a foot lever 46. The clutch is, as usual with presses and similar machines, automatically disengaged after each working stroke in the upper dead end position of the crank pin 41a. For this purpose a cam 47 is, for example, provided on one of the two sides of the crank, which cam, by means of one or two bolts 48 carried in the frame, moves the pressure ring 28 in the direction for disconnecting the clutch. If it is desired to effect a disconnection of the clutch during the working period of the press independently of the automatic disengagement of the clutch in the upper dead end position of the crank pin, this can be effected by swinging of the lever 51 rotatably pivoted at 49 to the bolt 48 and at 50 to the frame of the press, the lever being swung in the direction of the arrow $p^5$ for this purpose.

The advantages of the clutch in accordance with the present invention are the following:

The clutch member, which in the example illustrated is formed by the ring 6, acts by the braking of the disc 18 through the medium of the linkage 17, 14, 13, 12 and the clamping member 10 on the disc 5. The ring 6, disc 18, linkage and clamping member 10 rotate constantly with the driving pulley 1 so that on the engagement of the clutch apart from the crank shaft and the head of the pressure rod, only disc 5 has to be accelerated. This arrangement offers the further advantage that as the force necessary for the tensioning of the ring 6 is taken from the driving shaft, the operator has only to brake the disc 18 acting as the control motor. The engagement of the clutch is effected in the manner known in connection with friction clutches through small degrees, that is to say, relatively quickly, but still not suddenly, as occurs with claw, plunger or cone clutches. Nevertheless, the whole turning moment is transmitted at the end of the engaging operation. If the adjusted turning moment is exceeded, then the coupling begins to slip and then acts as a safety device.

As the control of large forces is to be obtained with the simpler means than the acceleration of large masses, the invention is based on the idea of arranging the clutch at the point where the masses to be accelerated are small even if the turning moments to be transmitted are large. This is the case in the arrangement according to the invention of the driven member of the clutch being on the crank shaft itself.

By the immediate transmission of the whole turning moment, the preliminary drop of the ram or a recoil after the pressing operation is prevented so that the braking of the crank shaft on the down stroke of the ram or a special recoil safety device become unnecessary.

The use of the disc 18 as an auxiliary brake is known. The invention, however, envisages only one such disc which not only swings the transmission linkage of the clutch member, but places it under tension so that on the engagement of the clutch the disengaging energy is already stored up. In this way, the arrangement of a special disengaging brake disc and of a reversing gear connected thereto which are provided on some known clutches is unnecessary. The use of only one auxiliary brake disc lessens the cost not only of the manufacture and the operation of the clutch on account of the lessening of the parts subjected to wear, but is above all advantageous in the use, according to the invention, of this clutch for crank driven presses and similar machines because with the latter the driving pinion or other wheel is mostly arranged as a flywheel and therefore the distance between the latter and the stationary member must be kept as small as possible. This requirement is satisfied practically entirely and in any case to an essentially greater extent by the arrangement of only one auxiliary brake disc than with two auxiliary brake discs and a reversing gear. With a clutch according to the invention, one auxiliary brake disc suffices for the engagement and disengagement, not only on account of the tension produced in the transmission linkage, but also because the transmission linkage is itself not locked. A self-locking linkage necessitates on the other hand in a similar manner as with a non-tensioned linkage, the arrangement, unsuitable for presses or the like, of the second auxiliary brake disc and the reversing gear.

The securing of the transmission linkage in the engaged position by means of a special latch makes the requirement of the auxiliary brake during the whole duration of the engaging unnecessary, so that a braking impulse suffices for engaging the clutch. By the provision of the non-self-locking transmission linkage not only are the second auxiliary brake disc and the appertaining reversing gear together with the attendant disadvantages, omitted, but the clutch is, in consequence of the particular tensioning of the linkage instantaneously released as the spring tensioning of the linkage is released on freeing the latch. This de-tensioning of the transmission linkage which is effected as quickly as the tensioning, is in the form shown by way of example, assisted by the force stored up in the coupling ring 6. The possibility of disengaging the press or the like by the use of the new clutch instantly, and indeed in any desired crank position, allows of a very simple and safe use of the press, the danger of accident is avoided and the press can with an incorrectly positioned workpiece be still stopped before the striking of the ram.

I claim:

1. In a friction clutch, suitable for use in a crank-driven press, the combination of a driving member, said member having a notch therein; a driven member arrangeable on the crank shaft of the press; an intermediate friction member; transmission links carried by said driving member; means for tensioning said transmission links to cause said friction member to couple said driving and driven members; a spring pressed latch carried by said tensioning means and engageable with said notch when said clutch is in fully engaged position and means for automatically releasing said latch to allow of the disengagement of the clutch.

2. In a friction clutch suitable for use in a crank-driven press, the combination of: a driving member having a notch therein; a driven member arrangeable on the crank shaft of the press; an intermediate friction member; transmission links carried by said driving member; means for tensioning said transmission links to cause said friction member to couple said driving and driven members; a spring pressed latch carried by said tensioning means and engageable with said notch when said clutch is in the engaged position; and a pressure ring, carried by said driven member and axially displaceable thereon to effect the release of said latch.

3. In a friction clutch, suitable for use in a crank-driven press, the combination of a driving member; a driven member arrangeable on the crank shaft of the press; an intermediate friction member; a brake disc freely carried by and normally rotatable with the driving member; transmission links carried by said driving member said links being rotatable with said driving member and slidably engageable at one end thereof with said disc; means for effecting relative angular movement between said driving member and said disc whereby said links are actuated to cause said friction member to couple said driving and driven members; and independent means for locking the said links, and consequently said clutch, in the engaged position.

4. In a friction clutch, suitable for use in a crank-driven press, the combination of: a driving pulley; a driven shaft; said pulley being freely rotatably mounted on said shaft, a drum on said pulley; a disc fixedly carried on said shaft within said drum; a split clutch ring within said drum and surrounding said disc, said ring normally frictionally engaging the inner surface of said drum so as to rotate therewith; a brake disc freely rotatably carried on the hub of said disc; a clutch actuating link mechanism pivoted to said drum and connected to said brake disc, whereby said brake disc and link mechanism normally rotate with said drum; means for angularly displacing said brake disc with respect to said driving pulley and drum, whereby said link mechanism is actuatable to cause said clutch ring frictionally to engage said first-mentioned disc and thereby couple said shaft to said drum; and means for retaining said link mechanism in the clutch engaged position.

5. In a friction clutch the combination of: a driving pulley; a driven shaft, said pulley being freely rotatably mounted on said shaft, a drum on said pulley; a disc fixedly carried on said shaft within said drum; a split clutch ring within said drum and surrounding said disc, said ring normally frictionally engaging the inner surface of said drum so as to rotate therewith; a brake disc freely rotatably carried on the hub of said disc; a clutch actuating link mechanism pivoted to said drum and connected to said brake disc, whereby said brake disc and link mechanism normally rotate with said drum; means for angularly displacing said brake disc with respect to said driving pulley and drum, whereby said link mechanism is actuatable to cause said clutch ring frictionally to engage said first-mentioned disc and thereby couple said shaft to said drum and a spring-pressed latch carried by said brake disc adapted, when the clutch is in the engaged position, to enter a notch formed in the drum for the purpose of retaining the clutch in engagement.

6. In a friction clutch, suitable for use in a crank-driven press, the combination of a driving member, a driven member, arrangeable on the crank shaft of the press, an intermediate friction member; transmission links carried by said driving member, means for actuating said transmission links to cause said friction member to couple said driving and driven members; a latch device for retaining said links in the clutch engaged position, after release of said link actuating means, and an axially displaceable pressure ring on said driven member for automatically releasing said latch.

7. In a friction clutch, suitable for use in a crank-driven press, the combination of a driving member, a driven member, arrangeable on the crank shaft of the press, an intermediate friction member; transmission links carried by said driving member, means for actuating said transmission links to cause said friction member to couple said driving and driven members; a latch device for retaining said links in the clutch engaged position, after release of said link actuating means, an axially displaceable pressure ring on said driven member for automatically releasing said latch, and independent manually operable means for releasing said latch as desired.

8. In a crank-driven press the provision of a friction clutch comprising in combination: a driving member freely rotatable on the crank shaft of the press, a driven member fixedly carried on said shaft; an intermediate friction member, a brake member rotatable with said driving member; transmission link mechanism associated with said brake member and adapted to actuate said friction member to couple said driving and driven members together, means for braking said brake member to tension said link mechanism, releasable means carried by said tensioning means for retaining said mechanism in the clutch engaged position, automatic means for releasing said mechanism to allow of the disengagement of the clutch when said crank shaft is in the upper dead end position, and independent means for manually effecting the release of said mechanism at any desired position of the said crank shaft.

9. In a crank driven press, the provision of a friction clutch comprising in combination: a driving member; a driven member; arranged on the crank shaft of the press: an intermediate friction ring; a transmission linkage pivoted adjacent one end thereof to said driving member, means for tensioning said transmission linkage to cause said linkage to actuate said friction ring; means for retaining said linkage in engaged position and manually operable means for releasing said retaining means at any desired position of said crank shaft.

10. In a friction clutch suitable for use in a crank driven press, the combination of: a driving member; a driven member; arrangeable on the crank shaft of the press; an intermediate friction ring; a transmission linkage pivoted adjacent one end thereof to said driving member, means for tensioning said transmission linkage to cause said linkage to actuate said friction ring; a latch device for retaining said linkage in engaged position and automatic means operable by the crank shaft for releasing said latch device after one complete revolution of said shaft.

11. In a friction clutch suitable for use in a crank-driven press, the combination of: a driving member; a driven member, arrangeable on the crank-shaft of the press; an intermediate friction ring; a plurality of interconnected transmission elements forming a clutch actuating link mechanism, said mechanism being pivoted adjacent one end thereof to and rotatable with the said driving member, means carried by said driven member for tensioning said link elements to cause said elements to tension said friction ring so as to couple said driving and driven members, the said link mechanism being slidably connected at the other end thereof to said link tensioning means, the arrangement being such that relative displacement of said link tensioning means with respect to said driving member causes tensioning of said link mechanism; means for retaining said link mechanism in engaged position; automatic means for releasing said retaining means at top dead centre position of said crank shaft and independent means for manually releasing said retaining means at any desired position of said crank shaft.

12. In a crank-driven press, the provision of a friction clutch comprising in combination: a driving member freely rotatable on the crank shaft of the press, a driven member fixedly carried on said shaft; an intermediate friction ring; a brake member rotatable with said driving member; transmission link mechanism associated with said brake member and adapted to actuate said friction member to couple said driving and driven members together, means for braking said brake member to tension said link mechanism to cause said friction ring to couple said driving and driven members, releasable means carried by said tensioning means for retaining said mechanism in the clutch engaged position, and automatic means for releasing said mechanism to allow of the disengagement of the clutch, when said crank shaft is in the upper dead end position.

LEO KNÖCHL.